US011861172B2

(12) United States Patent
Bhattacharjee et al.

(10) Patent No.: US 11,861,172 B2
(45) Date of Patent: Jan. 2, 2024

(54) SINGLE INPUT/OUTPUT WRITES IN A FILE SYSTEM HOSTED ON A CLOUD, VIRTUAL, OR COMMODITY-SERVER PLATFORM

(71) Applicant: NetApp, Inc., San Jose, CA (US)

(72) Inventors: Mrinal K. Bhattacharjee, Bangalore (IN); Boopathy Krishnamoorthy, Bangalore (IN); Vinay Kumar B C, Bangalore (IN); Shivali Gupta, Bangalore (IN); Saurabh Gupta, Haryana (IN)

(73) Assignee: NetApp, Inc., San Jose, CA (US)

( * ) Notice: Subject to any disclaimer, the term of this patent is extended or adjusted under 35 U.S.C. 154(b) by 0 days.

(21) Appl. No.: 17/672,401

(22) Filed: Feb. 15, 2022

(65) Prior Publication Data

US 2023/0214118 A1    Jul. 6, 2023

(30) Foreign Application Priority Data

Jan. 4, 2022   (IN) .............................. 202241000321

(51) Int. Cl.
*G06F 3/06* (2006.01)
(52) U.S. Cl.
CPC ............ *G06F 3/061* (2013.01); *G06F 3/0655* (2013.01); *G06F 3/0679* (2013.01)
(58) Field of Classification Search
CPC ....... G06F 3/0655; G06F 3/061; G06F 3/0679
See application file for complete search history.

(56) References Cited

U.S. PATENT DOCUMENTS

| 2010/0058002 | A1* | 3/2010 | Voll ..................... G06F 3/0689 |
| | | | 711/E12.002 |
| 2015/0347243 | A1* | 12/2015 | Guerin .............. G06F 15/17331 |
| | | | 709/212 |
| 2017/0031772 | A1* | 2/2017 | Subramanian ...... G06F 11/1451 |
| 2017/0344575 | A1 | 11/2017 | Naylor et al. |

OTHER PUBLICATIONS

Netapp, "Storage ONTAP Select," NetApp, Dec. 2, 2021, 34 pages.

* cited by examiner

*Primary Examiner* — Jane W Benner
(74) *Attorney, Agent, or Firm* — Jaffery Watson Mendonsa & Hamilton LLP

(57) ABSTRACT

Systems and methods for performing single I/O writes are provided. According to one embodiment, responsive to receipt of a write operation from a client by a file system layer of a node of a distributed storage system and a data payload of the operation having been determined to meet a compressibility threshold, an intermediate storage layer of the node logically interposed between the file system layer and a block storage media is caused to perform a single input/output (I/O) write operation that persists the compressed data payload and corresponding metadata to support asynchronous journaling of the write operation. The single I/O write operation coupled with the use of a new pool file that maintains a list of available blocks for single I/O write operations and a modified node crash recovery approach allows the write operation to be acknowledged to the client while the journaling is performed asynchronously.

20 Claims, 9 Drawing Sheets

US 11,861,172 B2

SINGLE INPUT/OUTPUT WRITES IN A FILE SYSTEM HOSTED ON A CLOUD, VIRTUAL, OR COMMODITY-SERVER PLATFORM

CROSS-REFERENCE TO RELATED APPLICATIONS

This application claims the benefit of Indian Provisional Application No. 202241000321, filed on Jan. 4, 2022, which is hereby incorporated by reference in its entirety for all purposes.

BACKGROUND

Field

Various embodiments of the present disclosure generally relate to file systems and data storage systems. In particular, some embodiments relate to an approach for reducing latency of write operations that is especially useful in the context of a file system hosted in an environment (e.g., a cloud, virtual, or commodity server platform) in which the data storage media (e.g., one or more block storage devices) and the journal storage medium used for performing journaling operate at similar speeds.

Description of the Related Art

Existing file systems may make certain assumptions about the underlying platform hosting the file system, for example, presupposing, the existence of high-speed non-volatile random access memory (NVRAM) and relatively lower-speed disks consistent with being hosted by a high-end physical storage appliance.

When a file system is hosted in an environment (e.g., a cloud platform, a virtual platform, or a commodity hardware platform with no battery backed NVRAM) in which the latency of the journal storage medium is similar (e.g., plus or minus 10%) to that of the block storage medium, the various mechanisms for performing write operations should be reengineered to achieve desired Input/Output operations per second (IOPS) and/or latency efficiencies.

SUMMARY

Systems and methods are described for performing single I/O writes. According to one embodiment, responsive to receipt of a write operation from a client by a file system layer of a node of a distributed storage system and a data payload of the operation having been determined to meet a compressibility threshold, an intermediate storage layer of the node logically interposed between the file system layer and a block storage media is caused to perform a single input/output (I/O) write operation. The single I/O write operation involves writing a packed block header containing an operation header entry corresponding to the write operation, and the data payload in compressed form to a data block associated with a particular block number within the block storage media. Responsive to completion of the single I/O write: (i) journaling of an operation header containing the particular block number is initiated by the file system; and (ii) without waiting for completion of the journaling, receipt of the write operation is acknowledged to the client by the file system.

Other features of embodiments of the present disclosure will be apparent from accompanying drawings and detailed description that follows.

BRIEF DESCRIPTION OF THE DRAWINGS

In the Figures, similar components and/or features may have the same reference label. Further, various components of the same type may be distinguished by following the reference label with a second label that distinguishes among the similar components. If only the first reference label is used in the specification, the description is applicable to any one of the similar components having the same first reference label irrespective of the second reference label.

DETAILED DESCRIPTION

Figure 1A:
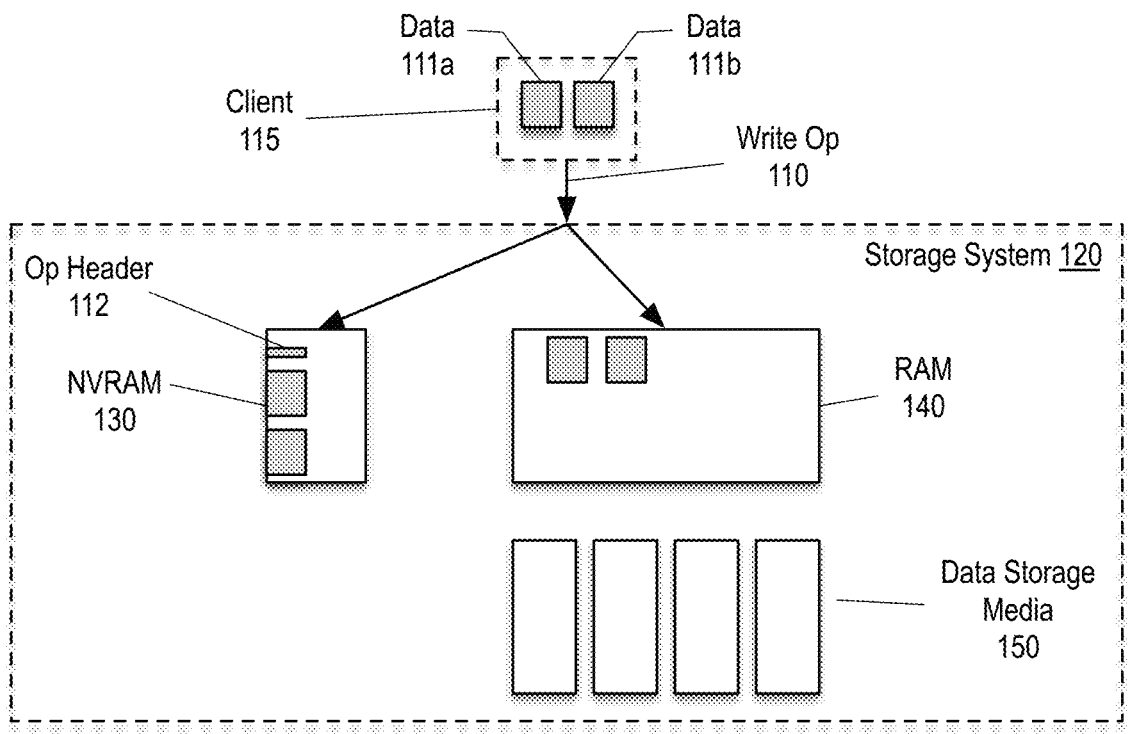
FIGS. 1A-D are high-level block diagrams conceptually illustrating handling of a write operation by a storage system in which the latency of journal media is less than the latency of data media.

Systems and methods are described for performing single I/O writes. As noted above, existing file systems may make certain assumptions about the underlying platform hosting the file system. The file system may presuppose, for example, the existence of high-speed non-volatile random access memory (NVRAM) and relatively lower-speed disks consistent with being hosted by a high-end physical storage appliance. Such assumptions result in the file system handling write operations in batches as described below with reference to FIGS. 1A-D. When a file system is hosted in an environment (e.g., a cloud platform, a virtual platform, or a commodity hardware platform with no battery backed NVRAM) in which the latency of the journal storage medium is similar (e.g., plus or minus 10%) to that of the block storage medium, the various mechanisms for performing write operations and associated journaling should be reengineered to achieve desired Input/Output operations per second (IOPS) and/or latency efficiencies. While some improvements are provided by the use of Single Instance Data Logging (SIDL), the write latency for SIDL is at least 2× the basic latency of the NVRAM/disk as explained below with reference to FIG. 2.

Various embodiments described herein seek to mitigate various shortcomings of the aforementioned approaches by providing a single Input/Output (I/O) write feature that brings the write latency for a write operation closer to 1× the basic latency of the NVRAM/disk. As described further below with reference to FIGS. 3, 6, and 7, according to one embodiment, responsive to receipt of a write operation from a client by a file system layer of a node of a distributed storage system and a data payload of the operation having been determined to meet a compressibility threshold, an intermediate storage layer of the node logically interposed between the file system layer and a block storage media is caused to perform a single I/O write operation. The single I/O write operation involves writing a packed block header containing an operation header entry corresponding to the write operation, and the data payload in compressed form to a data block associated with a particular block number within the block storage media. Responsive to completion of the single I/O write: (i) journaling of an operation header containing the particular block number is initiated by the file system; and (ii) without waiting for completion of the journaling, receipt of the write operation is acknowledged to the client by the file system. By allowing the write operation to avoid waiting for completion of the journaling, the 2× or more basic latency of the NVRAM/disk for a write operation by SIDL may be brought down to 1× the basic latency of the NVRAM/disk.

In the following description, numerous specific details are set forth in order to provide a thorough understanding of embodiments of the present disclosure. It will be apparent, however, to one skilled in the art that embodiments of the present disclosure may be practiced without some of these specific details. In other instances, well-known structures and devices are shown in block diagram form.

Terminology

Brief definitions of terms used throughout this application are given below.

A "computer" or "computer system" may be one or more physical computers, virtual computers, or computing devices. As an example, a computer may be one or more server computers, cloud-based computers, cloud-based cluster of computers, virtual machine instances or virtual machine computing elements such as virtual processors, storage and memory, data centers, storage devices, desktop computers, laptop computers, mobile devices, or any other special-purpose computing devices. Any reference to "a computer" or "a computer system" herein may mean one or more computers, unless expressly stated otherwise.

The terms "connected" or "coupled" and related terms are used in an operational sense and are not necessarily limited to a direct connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

If the specification states a component or feature "may", "can", "could", or "might" be included or have a characteristic, that particular component or feature is not required to be included or have the characteristic.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The phrases "in an embodiment," "according to one embodiment," and the like generally mean the particular feature, structure, or characteristic following the phrase is included in at least one embodiment of the present disclosure and may be included in more than one embodiment of the present disclosure. Importantly, such phrases do not necessarily refer to the same embodiment.

As used herein a "cloud" or "cloud environment" broadly and generally refers to a platform through which cloud computing may be delivered via a public network (e.g., the Internet) and/or a private network. The National Institute of Standards and Technology (NIST) defines cloud computing as "a model for enabling ubiquitous, convenient, on-demand network access to a shared pool of configurable computing resources (e.g., networks, servers, storage, applications, and services) that can be rapidly provisioned and released with minimal management effort or service provider interaction." P. Mell, T. Grance, The NIST Definition of Cloud Computing, National Institute of Standards and Technology, USA, 2011. The infrastructure of a cloud may cloud may be deployed in accordance with various deployment models, including private cloud, community cloud, public cloud, and hybrid cloud. In the private cloud deployment model, the cloud infrastructure is provisioned for exclusive use by a single organization comprising multiple consumers (e.g., business units), may be owned, managed, and operated by the organization, a third party, or some combination of them, and may exist on or off premises. In the community cloud deployment model, the cloud infrastructure is provisioned for exclusive use by a specific community of consumers from organizations that have shared concerns (e.g., mission, security requirements, policy, and compliance considerations), may be owned, managed, and operated by one or more of the organizations in the community, a third party, or some combination of them, and may exist on or off premises. In the public cloud deployment model, the cloud infrastructure is provisioned for open use by the general public, may be owned, managed, and operated by a cloud provider (e.g., a business, academic, or government organization, or some combination of them), and exists on the premises of the cloud provider. The cloud service provider may offer a cloud-based platform, infrastructure, application, or storage services as-a-service, in accordance with a number of service models, including Software-as-a-Service (SaaS), Platform-as-a-Service (PaaS), and/or Infrastructure-as-a-Service (IaaS). In the hybrid cloud deployment model, the cloud infrastructure is a composition of two or more distinct cloud infrastructures (private, community, or public) that remain unique entities, but are bound together by standardized or proprietary technology that enables data and application portability (e.g., cloud bursting for load balancing between clouds).

FIGS. 1A-D are high-level block diagrams conceptually illustrating handling of a write operation 110 by a storage system 120 in which the latency of journal media (e.g., NVRAM 130) is less than the latency of data media 150. Existing file systems may make certain assumptions about the underlying platform hosting the file system, for example, presupposing, the existence of high-speed non-volatile random access memory (NVRAM) and relatively lower-speed disks consistent with being hosted by a high-end physical storage appliance. As such, in the context of a storage solution that handles large volumes of client requests, it may be impractical for the file system to persist data modifications to disk (e.g., block storage) every time a write operation is received from a client (e.g., client 115) as disk accesses tend to take a relatively long time compared to storage to other media (e.g., NVRAM 130). Therefore, in the context of the present example, storage system 120 may instead temporarily hold write requests (e.g., write operation 110) in memory (e.g., RAM 140), which may also be referred to as a buffer cache, and only periodically (e.g., every few seconds) save the modified data to the data media (e.g., mass storage devices). The event of saving the modified data to the mass storage devices may be referred to as a consistency point (CP). As discussed below with reference to FIG. 1C, at a CP point, the storage system 120 saves any data that was modified by write requests to its local mass storage devices and when operating in high-availability (HA) mode triggers a process of updating the mirrored data stored at the destination storage node.

In this approach, there is a small risk of a system failure occurring between CPs, causing the loss of data modified after the last CP. Consequently, in at least one approach, the storage system may maintain a log or journal of certain storage operations within NVRAM 130 that have been performed since the last CP. For example, this log may include a separate journal entry (e.g., including an operation header 112) for each storage request received from a client that results in a modification to the file system or data. Such entries for a given file may include, for example, "Create File," "Write File Data," and the like. Each journal entry may also include the data to be written according to the corresponding request. The journal may be used in the event of a failure to recover data that would otherwise be lost. For example, in the event of a failure, it may be possible to replay the journal to reconstruct the current state of stored data just prior to the failure.

FIG. 1A is a high-level block diagram conceptually illustrating a first stage of handling of a write operation 110 by a storage system 120. Responsive to receipt of the write operation 110, the data payload (e.g., data 111a and data 111b) are stored in a journal entry in NVRAM 130 and to RAM 140. Data 111a-b may represent data blocks having a block size of 4 kilobytes (KB). As noted above, the journal entry may also include an operation header 112 including an opcode of the write operation 110.

Figure 1B:
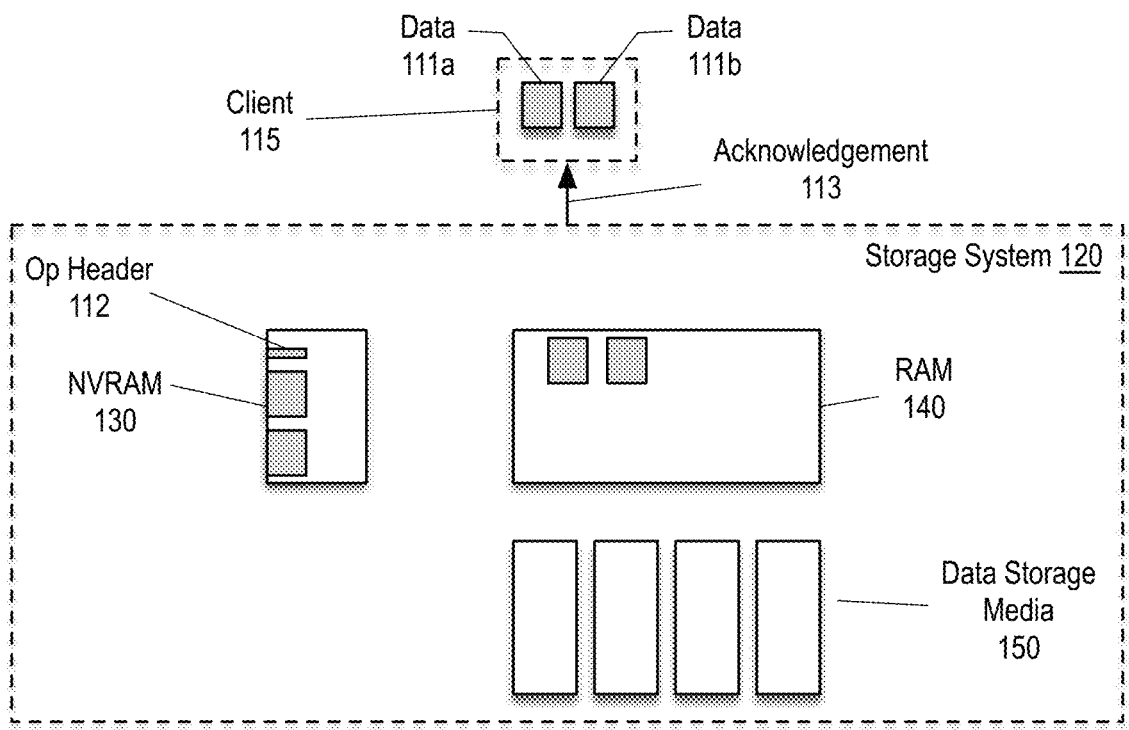

FIG. 1B is a high-level block diagram conceptually illustrating continued handling of the write operation 110 by the storage system 120 in a subsequent stage following the first stage illustrated by FIG. 1A. In this subsequent stage, after the data payload has been stored to RAM 140 and the journal entry for the write operation 110 has been created within NVRAM 130, the storage system 120 acknowledges the write operation 110 to the client, for example, in the form of an acknowledgement 113.

Figure 1C:
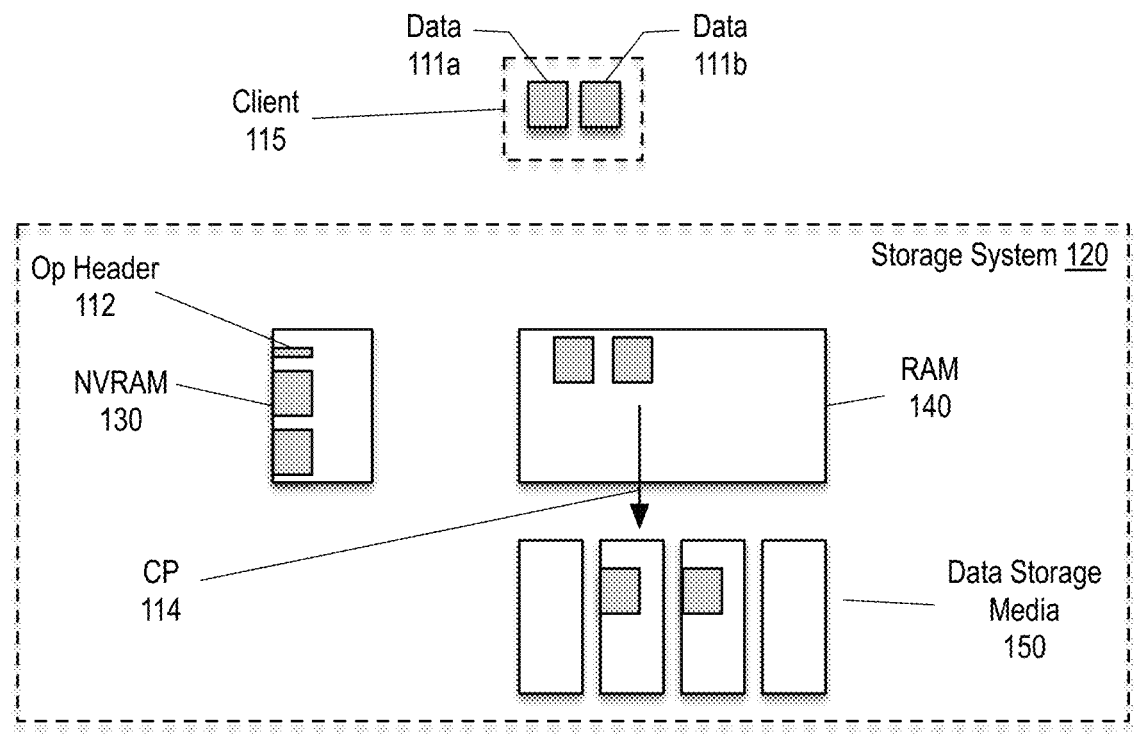

FIG. 1C is a high-level block diagram conceptually illustrating continued handling of the write operation 110 by the storage system 120 in a subsequent stage following the stage illustrated by FIG. 1B. This subsequent stage is performed responsive to a consistency point (e.g., CP 114), which may represent expiration of a timer. Responsive to the CP 114, the storage system 120 saves data in RAM 140 to the data media 150.

Figure 1D:
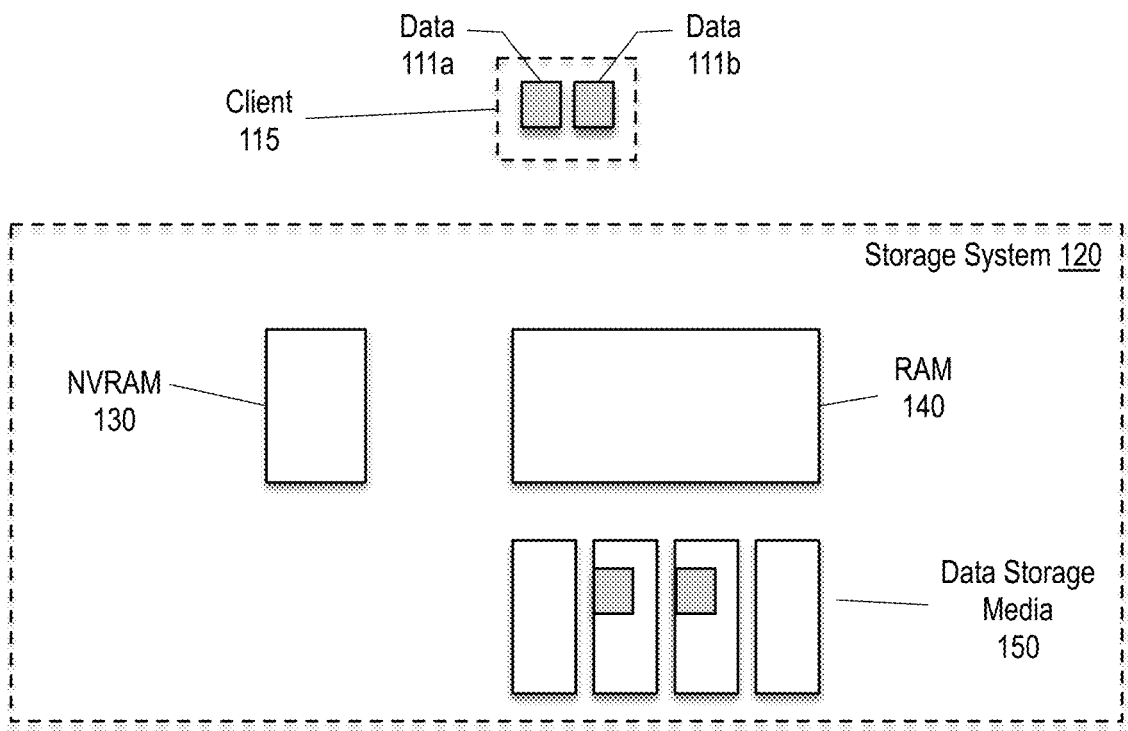

FIG. 1D is a high-level block diagram conceptually illustrating continued handling of the write operation 110 by the storage system 120 in a subsequent stage following the stage illustrated by FIG. 1C. This subsequent stage is performed responsive to successful storage of the data temporarily held in RAM 140 to the data media 150. At this point, both the journal in NVRAM 130 and the data in RAM 140 may be cleared.

Single Instance Data Logging (SIDL)

Figure 2:
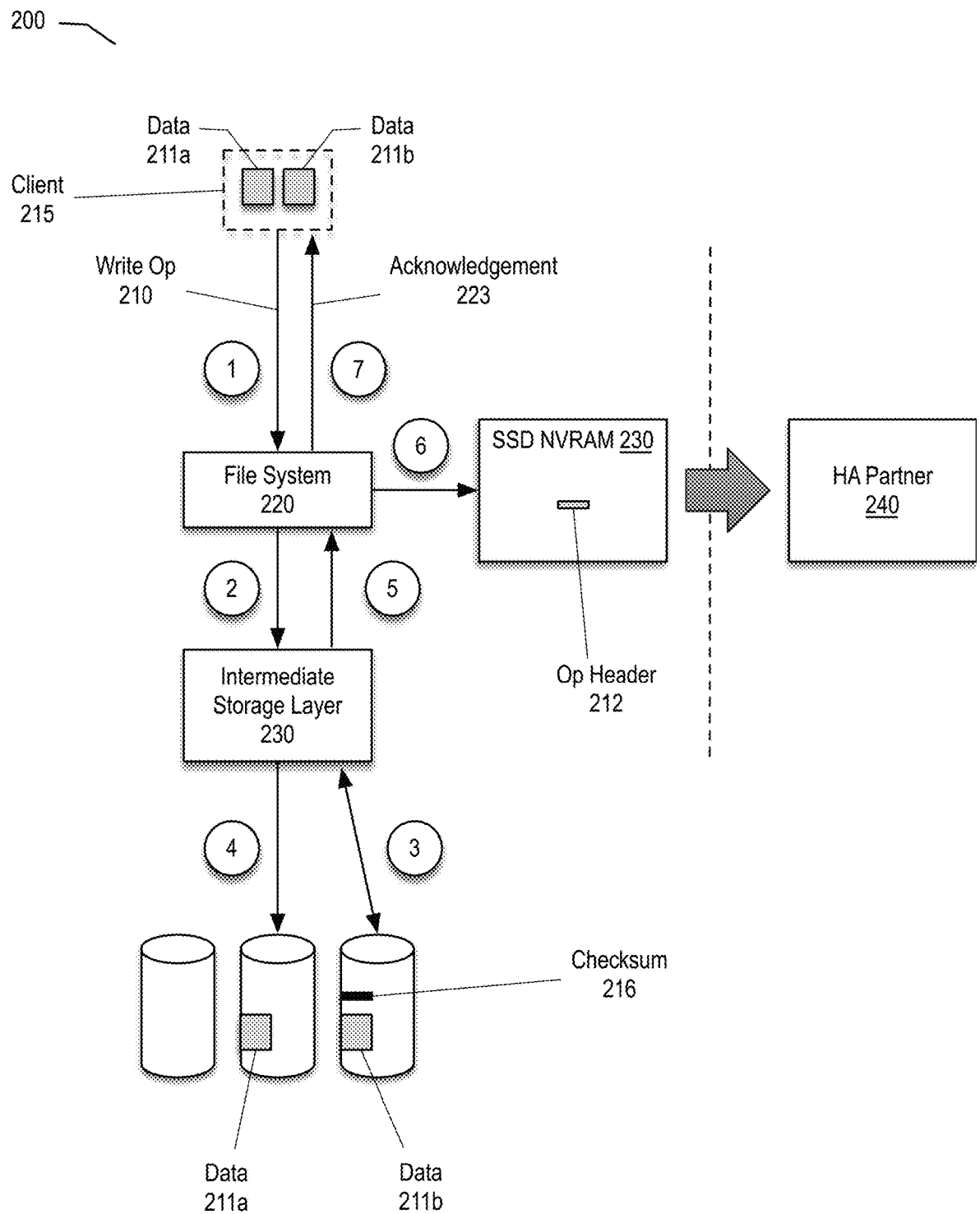
FIG. 2 is a block diagram conceptually illustrating the use of Single Instance Data Logging (SIDL).

FIG. 2 is a block diagram conceptually illustrating the use of Single Instance Data Logging (SIDL). In the context of the present example, an environment 200 hosting a file system 220 of a storage node is one (e.g., a cloud or virtual platform) in which disk storage media are used for both journal storage and data storage. Those skilled in the art will appreciate when the journal media (e.g., SSD NVRAM 230) latency is similar to that of the data disk latency, then there is no benefit to journaling the data payload (e.g., data 211a-b) of a write operation (e.g., 210) first and then storing the data payload to the data disk later. Additionally, when the file system 220 is hosted by cloud compute machines (e.g., virtual machines (VMs)) the VMs may have limitations on the number of disk Input/Output per Second (IOPS) that may be performed and the provider of the distributed storage system (e.g., a storage service provider) of which the storage node is a part may be charged by the cloud service provider on a per IOPS basis. As such, it may be desirable for the storage service provider to implement mechanisms to reduce disk IOPS as will be explained below.

Responsive to receipt of the write operation 210 (at step 1), the file system 220 bypasses writing the data payload (e.g., data 211a-b) of the write operation 210 to the SSD NVRAM 230 and instead (at step 2) causes the data payload to be immediately written to disk (at step 3) via an intermediate storage layer 230 (e.g., one or both of a redundant array of independent disks (RAID) layer and a storage layer). For example, the file system 220 may issue a RAID I/O to write the data payload to one or more corresponding blocks (e.g., virtual volume block numbers (VVBNs) or physical volume block numbers (PVBNs)). At step 3, the intermediate storage layer 230 reads the checksum (e.g., within an advanced zoned checksum (AZCS) checksum block) for the block from disk and updates the checksum data for the block, for example, via a read-modify-write (RMW) operation. At step 4, the RAID I/O writes the data to disk and the intermediate storage layer 230 (at step 5) waits for the write to disk to complete. At this point (at step 6), the file system 220 may perform a journaling operation by storing the operation header 212 (which includes the block number(s)) to which the data was stored on disk) to the SSD NVRAM 230. The file system 220 waits (at step 7) for the journaling operation to be completed and then sends an acknowledgement 223 back to the client 215.

Notably, the storage of data to disk (at step 4) and the operation header 212 to SSD NVRAM 230 (at step 6) cannot be done in parallel because of the potential for intervening system crash situations. For example, if storage of the operation header 212 to SSD NVRAM 230 were to complete and a system crash occurred before the data was written to disk, problems would arise during replay as the data is presumed to be correct on the disk. Therefore, SIDL serializes the storage of data to disk and the storage of the operation header 212 to SSD NVRAM 230 as shown in FIG. 2 and described above.

In view of the foregoing, it will be appreciated while SIDL is helpful in reducing disk IOPS (e.g., as a result of bypassing storage of the data payload to the SSD NVRAM 230), the write latency for SIDL is at least 2× (and maybe 3× if the AZCS checksum operation is included) the basic latency of the NVRAM/disk as a result of the waiting performed at step 5 and step 7.

Single Input/Output Write

Figure 3:
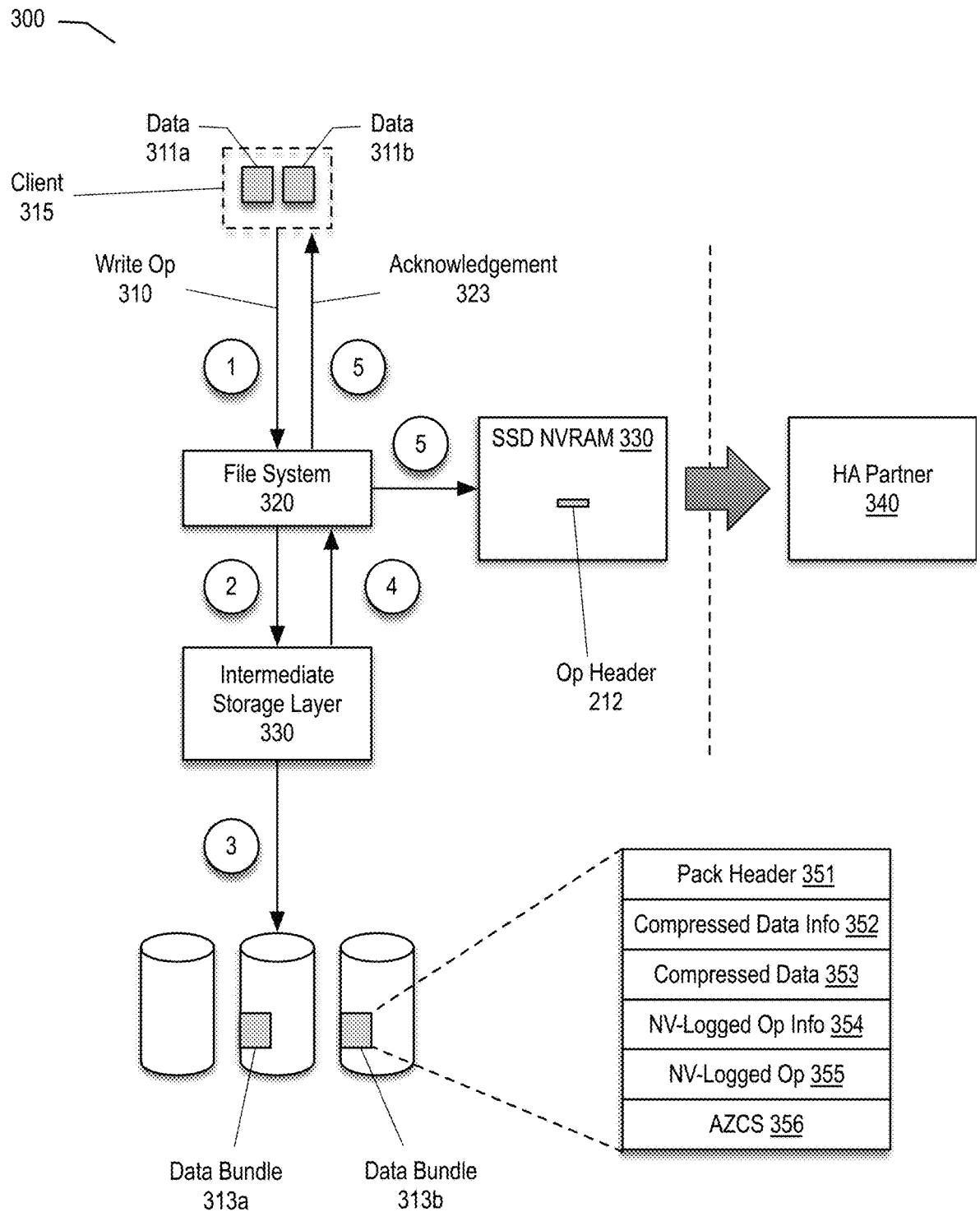
FIG. 3 is a block diagram conceptually illustrating the use of a single Input/Output (I/O) write feature in accordance with an embodiment of the present disclosure.

FIG. 3 is a block diagram conceptually illustrating the use of a single Input/Output (I/O) write feature in accordance with an embodiment of the present disclosure. The single I/O write feature proposed herein seeks to bring the write latency for a write operation (e.g., write operation 310) closer to 1× the basic latency of the NVRAM/disk. In one embodiment, a new data bundle format (e.g., data bundle 313b) is used that includes a pack header 351, compressed data information 352, compressed data 353, NV-logged operation information 354, NV-logged operation 355, and a checksum (e.g., AZCS checksum 356) for the data bundle. According to one embodiment, the pack header 351 includes an operation header entry identifying the number of objects contained within the data bundle, the compressed data information 352 includes information identifying the compression algorithm used to compress the data payload of the write operation, the compressed data 353 represents the data payload in compressed form, the NV-logged operation information 354 includes information identifying the CP with which the write operation is associated, and the NV-logged operation 355 includes an operation header (e.g., operation header 312) specifying the operation and the block to which the data payload was stored on disk.

In the context of the present example, an environment 300 hosting a file system 320 of a storage node is similar to that of environment 200 in which disk storage media are used for both journal storage and data storage. Similar to SIDL, responsive to receipt of a write operation 310 (at step 1), the file system 320 bypasses writing the data payload (e.g., data 311a-b) of the write operation 310 to the SSD NVRAM 330 and instead (at step 2), assuming the data payload is compressible enough to allow inclusion of the desired metadata in addition to the compressed data payload within one or more data bundles (e.g., data bundle 311a-b), causes the data bundles to be immediately written to disk (at step 3) via an intermediate storage layer 330 (e.g., one or both of a RAID layer and a storage layer). For example, the file system 320 may issue a RAID I/O to write the data bundles to one or more corresponding blocks (e.g., VVBNs or PVBNs). At step 3, the RAID I/O writes the data to disk and the intermediate storage layer 330 (at step 4) waits for the write to disk to complete. At this point (at step 5), the file system 320 may send an acknowledgement to the client 315 and in parallel may issue a local copy operation to perform an asynchronous journaling operation. That is, without waiting for completion of the journaling operation that stores the operation header 312 (which includes the block number(s)) to which the data bundle(s) was/were stored on disk) to the SSD NVRAM 330, the file system 320 acknowledges receipt of the write operation 310 to the client 315.

As explained further below with reference to FIG. 6, this results in a single I/O to the disk before returning the acknowledgement 323 to the client 315. In this manner, the 2x or more basic latency of the NVRAM/disk for a write operation by SIDL is brought down to 1x.

As those skilled in the art will appreciate, in this example, due to the asynchronous performance of journaling in parallel with the return of the acknowledgement 323, writes of the operation header 312 to the SSD NVRAM 330 for successive write operations will occur in order, but their corresponding acknowledgements to the client 315 may be returned out of order.

As described further below with reference to FIGS. 6 and 7, by making use of a pool file that maintains a list of available blocks for single I/O write operations, intervening system crash situations do not result in data compromises.

Example Operating Environment

Figure 4:
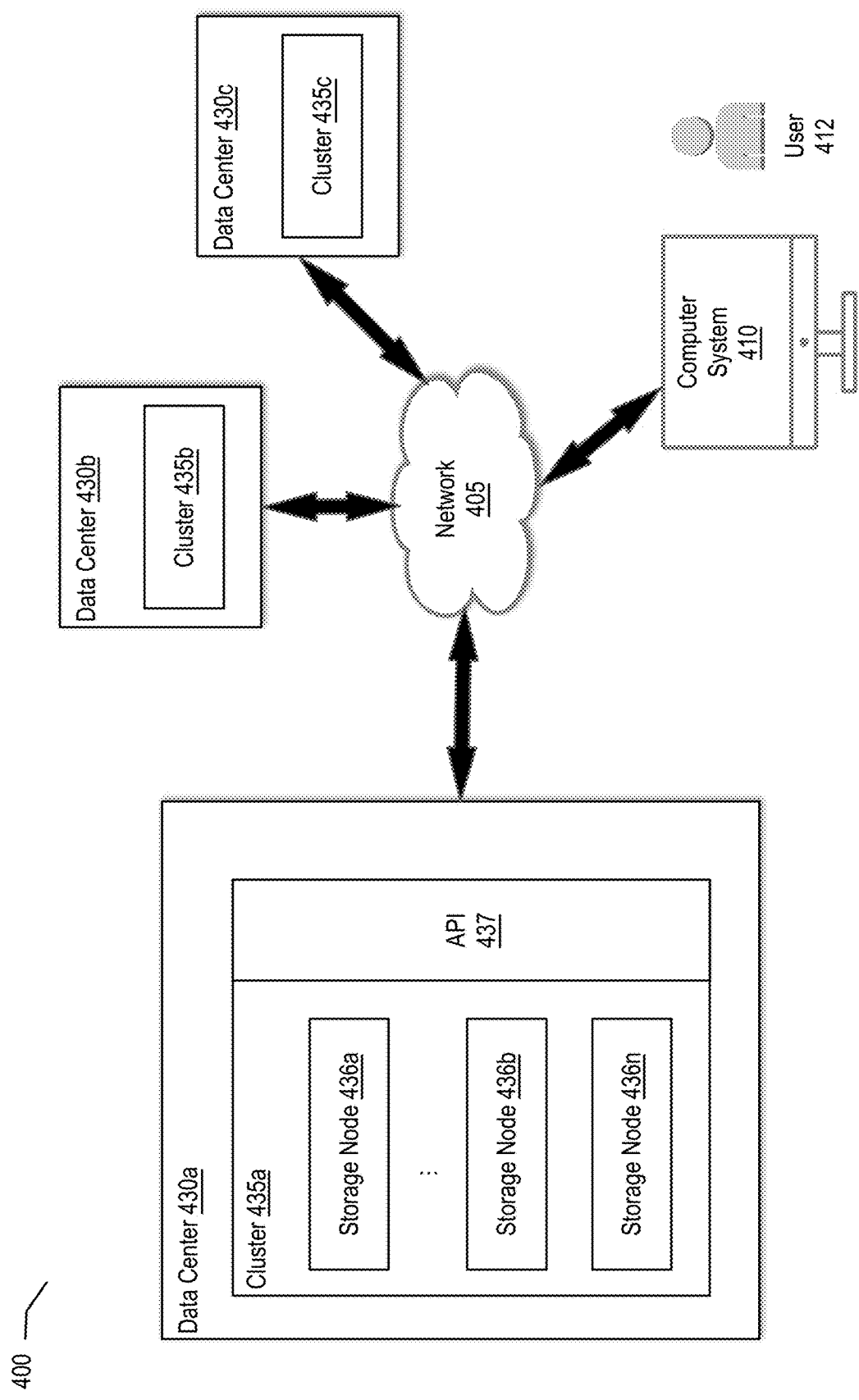
FIG. 4 is a block diagram illustrating an environment in which various embodiments may be implemented.

FIG. 4 is a block diagram illustrating an environment 400 in which various embodiments may be implemented. In the context of the present example, the environment 100 includes multiple data centers 430a-c, a computer system 410, and a user 412. The data centers 430a-c, and the computer system 410 are coupled in communication via a network 405, which, depending upon the particular implementation, may be a Local Area Network (LAN), a Wide Area Network (WAN), or the Internet. User 412 may represent an administrator responsible for monitoring and/or configuring a distributed storage system (e.g., cluster 435a) or a managed service provider responsible for multiple distributed storage systems (e.g., clusters 435a-c) of the same or multiple customers via a browser-based interface presented on computer system 410.

Data center 430a may be considered exemplary of data centers 430b-c and may represent an enterprise data center (e.g., an on-premise customer data center) that is owned and operated by a company, managed by a third party (or a managed service provider) on behalf of the company, which may lease the equipment and infrastructure, or may represent a colocation data center in which the company rents space of a facility owned by others and located off the company premises. While in this simplified example, data center 430a is shown including a distributed storage system (e.g., cluster 135), those of ordinary skill in the art will appreciate additional IT infrastructure may be included within the data center 130a.

Turning now to the cluster 435a, which may be considered exemplary of clusters 435b-c, it includes multiple storage nodes 436a-n and an Application Programming Interface (API) 437. In the context of the present example, the multiple storage nodes 436a-n are organized as a cluster and provide a distributed storage architecture to service storage requests issued by one or more clients (not shown) of the cluster. The data served by the storage nodes 436a-n may be distributed across multiple storage units embodied as persistent storage devices, including but not limited to HDDs, SSDs, flash memory systems, or other storage devices. A non-limiting example of a storage node 436 is described in further detail below with reference to FIG. 7.

The API 437 may provide an interface through which the cluster 435a is configured and/or queried by external actors (e.g., the computer system 410 and/or storage clients). Depending upon the particular implementation, the API 437 may represent a Representational State Transfer (REST)ful API that uses Hypertext Transfer Protocol (HTTP) methods (e.g., GET, POST, PATCH, DELETE, and OPTIONS) to indicate its actions. Depending upon the particular embodiment, the API 437 may provide access to various telemetry data (e.g., performance, configuration, storage efficiency metrics, and other system data) relating to the cluster 435a or components thereof.

While for sake of illustration, three data center and three clusters are shown in the context of the present example, it is to be appreciated that more of fewer clusters owned by or leased by the same or different companies (data storage subscribers/customers) may be used in different operational environments and such clusters may reside in multiple data centers of different types (e.g., enterprise data centers, managed services data centers, or colocation data centers).

Figure 5:
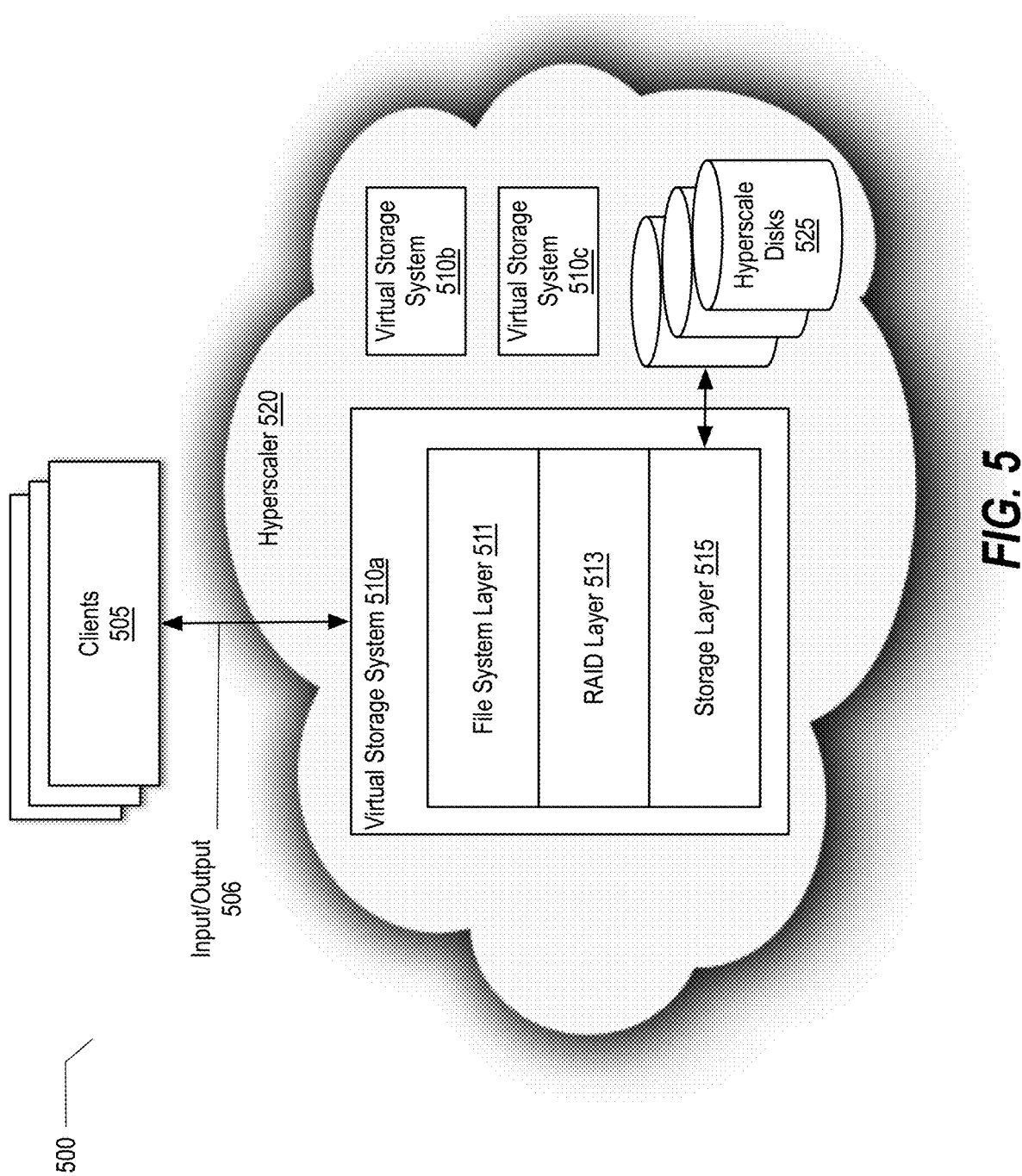
FIG. 5 is a block diagram illustrating another environment in which various embodiments may be implemented.

FIG. 5 is a block diagram illustrating another environment 500 in which various embodiments may be implemented. In various examples described herein, a virtual storage system 510a, which may be considered exemplary of virtual storage systems 510b-c, may be run (e.g., on a VM or as a containerized instance, as the case may be) within a public cloud provided by a public cloud provider (e.g., hyperscaler 520). In the context of the present example, the virtual storage system 510a makes use of cloud disks (e.g., hyperscale disks 525) provided by the hyperscaler.

The virtual storage system 510a may present storage over a network to clients 505 using various protocols (e.g., small computer system interface (SCSI), Internet small computer system interface (ISCSI), fibre channel (FC), common Internet file system (CIFS), network file system (NFS), hypertext transfer protocol (HTTP), web-based distributed authoring and versioning (WebDAV), or a custom protocol. Clients 105 may request services of the virtual storage system 510 by issuing Input/Output requests 506 (e.g., file system protocol messages (in the form of packets) over the network). A representative client of clients 505 may comprise an application, such as a database application, executing on a computer that "connects" to the virtual storage system 510 over a computer network, such as a point-to-point link, a shared local area network (LAN), a wide area network (WAN), or a virtual private network (VPN) implemented over a public network, such as the Internet.

In the context of the present example, the virtual storage system 510a is shown including a number of layers, including a file system layer 511 and one or more intermediate storage layers (e.g., a RAID layer 513 and a storage layer 515). These layers may represent components of data management software (not shown) of the virtual storage system 510. The file system layer 511 generally defines the basic interfaces and data structures in support of file system operations (e.g., initialization, mounting, unmounting, creating files, creating directories, opening files, writing to files, and reading from files). A non-limiting example of the file system layer 511 is the Write Anywhere File Layout (WAFL) Copy-on-Write file system (which represents a component or layer of ONTAP software available from NetApp, Inc. of San Jose, CA).

The RAID layer 513 may be responsible for encapsulating data storage virtualization technology for combining multiple disks into RAID groups, for example, for purposes of data redundancy, performance improvement, or both. The storage layer 115 may include storage drivers for interacting with the various types of hyperscale disks supported by the hyperscaler 520. Depending upon the particular implementation the file system layer 511 may persist data to the hyperscale disks 525 using one or both of the RAID layer 513 and the storage layer 515.

The various layers described herein, and the processing described below with reference to the flow diagrams of FIGS. 6 and 7 may be implemented in the form of executable instructions stored on a machine readable medium and executed by a processing resource (e.g., a microcontroller, a microprocessor, central processing unit core(s), an application-specific integrated circuit (ASIC), a field programmable gate array (FPGA), and the like) and/or in the form of other types of electronic circuitry. For example, the processing may be performed by one or more virtual or physical computer systems of various forms (e.g., servers, blades, network storage systems or appliances, and storage arrays, such as the computer system described with reference to FIG. 8 below.

Example Single I/O Write Processing

Figure 6:
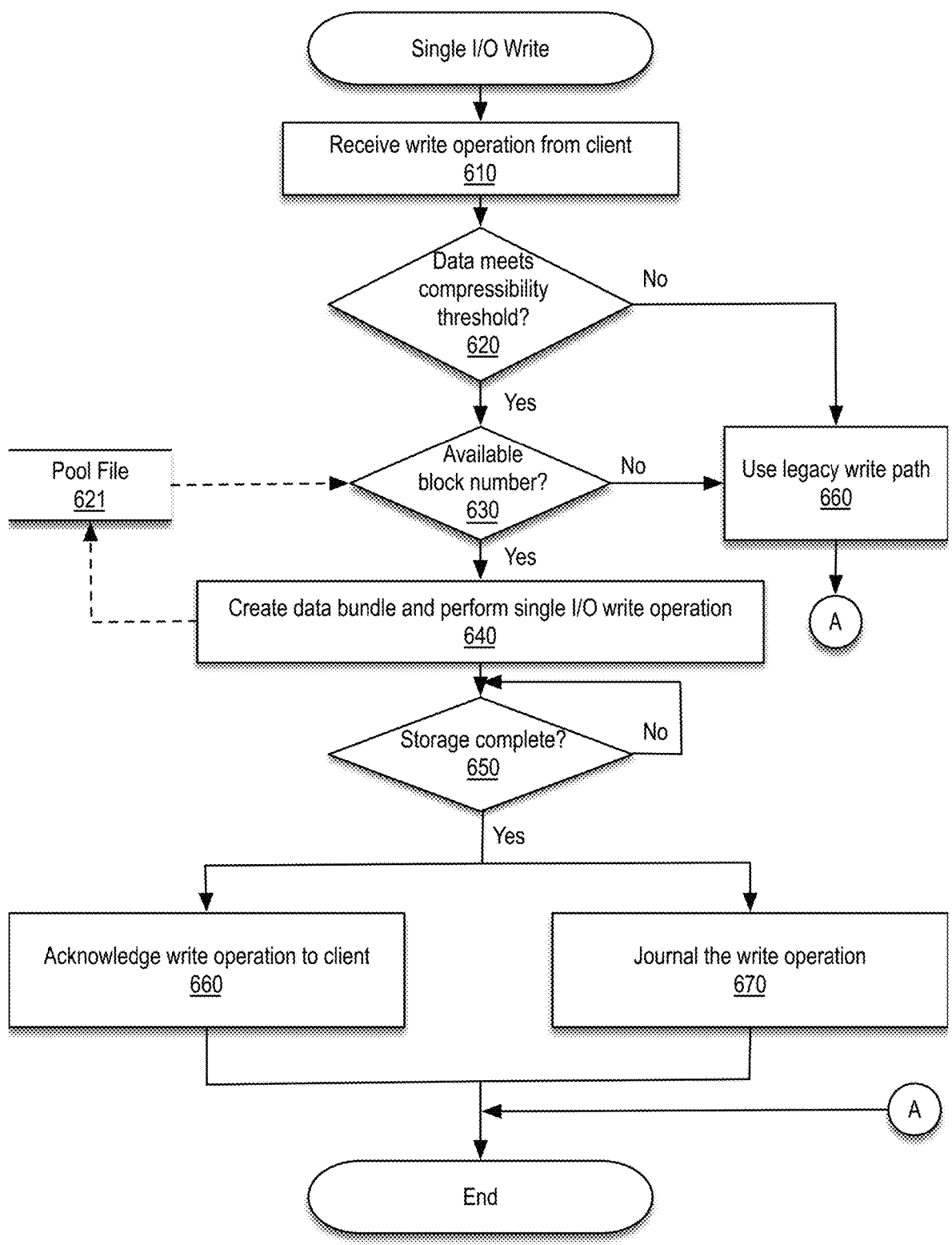
FIG. 6 is a flow diagram illustrating operations for performing single I/O write in accordance with an embodiment of the present disclosure.

FIG. 6 is a flow diagram illustrating operations for performing single I/O write in accordance with an embodiment of the present disclosure. In the context of the present example, it is assumed a pool of blocks available for single I/O write operations is maintained in a pool file (e.g., pool file 621). The pool file may represent a persistent (on-disk) data structure. In one embodiment, upon initialization, a storage node (e.g., one of storage nodes 436a-n or one of virtual storage systems 510a-c) may proactively identify a list of available (free) data blocks that may be used for single I/O write operations and store that list to the pool file. In this manner, the identification of free data blocks need not be performed during the single I/O write operation.

At block 610, a write operation (e.g., write operation 310) is received by a storage node. More specifically, the write operation may be received by a file system (e.g., file system layer 511) of the storage node. The write operation may be issued by an application (e.g., one of clients 505). In one embodiment, the storage node may be part of a distributed storage system (e.g., one of clusters 435a-c). The write operation may include a data payload having one or more blocks of data of a particular block size (e.g., 4 KB, 8 KB, etc.).

At decision block 620, a determination may be made by the file system regarding whether the data payload of the write operation meets a compressibility threshold. If so, processing continues with decision block 630; otherwise, processing branches to block 660. The compressibility threshold depends upon the size of the checksum and metadata to be included in the data bundle format (e.g., data bundle 313b). In one embodiment, the checksum is an AZCS checksum (e.g., AZCS checksum 356) and the metadata includes a pack header (e.g., pack header 351), information regarding the compressed data information (e.g., compressed data information 352), information regarding the NV-logged operation (e.g., NV-logged operation information 354). Assuming an embodiment in which the metadata size is approximately 300 bytes and the data block size is 4 KB, the compressibility threshold would be approximately 7%. That is, in such an embodiment, a given data block of the data payload of the write operation should be compressible by approximately 7% to allow for the compressed data payload (e.g., compressed data 353), the metadata, and the checksum to fit within a 4 KB data bundle.

At decision block 630, it is determined by the file system whether block number(s) are available for use by single I/O. If so, processing continues with block 640; otherwise, processing branches to block 660. In the context of the present example, this determination is made with reference to the pool file. For example, the list of blocks in the pool file may be tagged or marked as they are consumed by a single I/O write.

At block 660, a legacy write path (e.g., a slow write path or a SIDL write path) may be used to store the data payload of the write operation to disk as a reason has been identified that precludes the use of a single I/O write. For example, the data payload of the write operation may not be sufficiently compressible or there may be no VVBNs or PVBNs that are available for use by single I/O write. While only two reasons for avoiding the use of single I/O write are shown in this example, there may be reasons for rejecting the use of single I/O for the write operation.

At block 640, a data bundle is created, the pool file is updated, and the single I/O write operation is performed. In one embodiment, this may involve the use of an intermediate storage layer (e.g., intermediate storage layer 330) interposed between the file system and the disks. In one embodiment, the file system may issue a RAID I/O to a RAID layer (e.g., RAID layer 513) to write the populated data bundle including the compressed data payload of the write operation, metadata, and the AZCS checksum.

At decision block 650, the intermediate storage layer waits until the storage of the data bundle has been completed. For example, in one embodiment, after the RAID I/O has finished, processing continues with blocks 660 and 670 in parallel.

At block 660, the write operation is acknowledged to the client, for example, by the file system, sending an acknowledgement (e.g., acknowledgement 323) to the client.

At block 670, write operation journaling may be initiated. For example, the file system may perform a local copy of the operation header (e.g., operation header 312) to the journal media (e.g., SSD NVRAM 330). In one embodiment, information regarding the current CP count may be included within the packed block header or the operation header to facilitate crash recovery as described further below.

In some embodiments, the storage node may be operating in a high-availability (HA) configuration. For example, the storage node may be part of a local distributed storage system (or local cluster) and may be paired with a partner storage node in a remote distributed storage system (or remote cluster). The local storage node may be designated as a primary node and may be responsible for serving all I/O operations (e.g., read and write operations) made by clients and the HA partner node of the remote distributed storage system may be designated as the secondary node. when operating in the HA configuration, a data backup technique used by storage systems referred to as "mirroring," involving backing up data stored at one node or storage system by storing a duplicate (a mirror image) of the data to another node or storage system, may be performed. Mirroring may be performed in one direction (e.g., from the primary to the secondary). Alternately, both the local and remote distributed storage systems may be operable to serve I/O, and both may be capable of operating in the role of a primary or secondary with respect to the other. In this configuration, the mirroring may be performed in either direction depending upon the node that is operating as the source storge node for a particular storage request.

In one embodiment, when the storage node is configured to perform mirroring, completion of the local write operation journaling may further trigger performing a remote copy operation to transfer a copy of the journal to the HA partner node. In this manner, in the event of a system crash of one of the HA partner nodes, upon restart of the crashed node it may identify those of multiple single I/O write operations performed by the HA partner node prior to performance of the last CP that are to be reconstructed and replayed based on the pool file, information regarding the last CP, and operation headers contained in the journal as described further below with reference to FIG. 7.

In the manner described above, the write latency for single I/O write is closer to 1× the basic latency of the NVRAM/disk as the only time spent waiting for a write to disk to complete is during decision block 650.

While in the context of the present example, acknowledgement to the client (block 660) is described as being performed prior to initiation of the journaling (block 670) of the write operation, in other examples, journaling (block 670) may be initiated prior to acknowledgement (block 660); however, the acknowledgement should not wait for completion of the journaling.

While in the context of the present example, a number of enumerated blocks are included, it is to be understood that examples may include additional blocks before, after, and/or in between the enumerated blocks. Similarly, in some examples, one or more of the enumerated blocks may be omitted and/or performed in a different order.

Example Crash Recovery Processing

Figure 7:
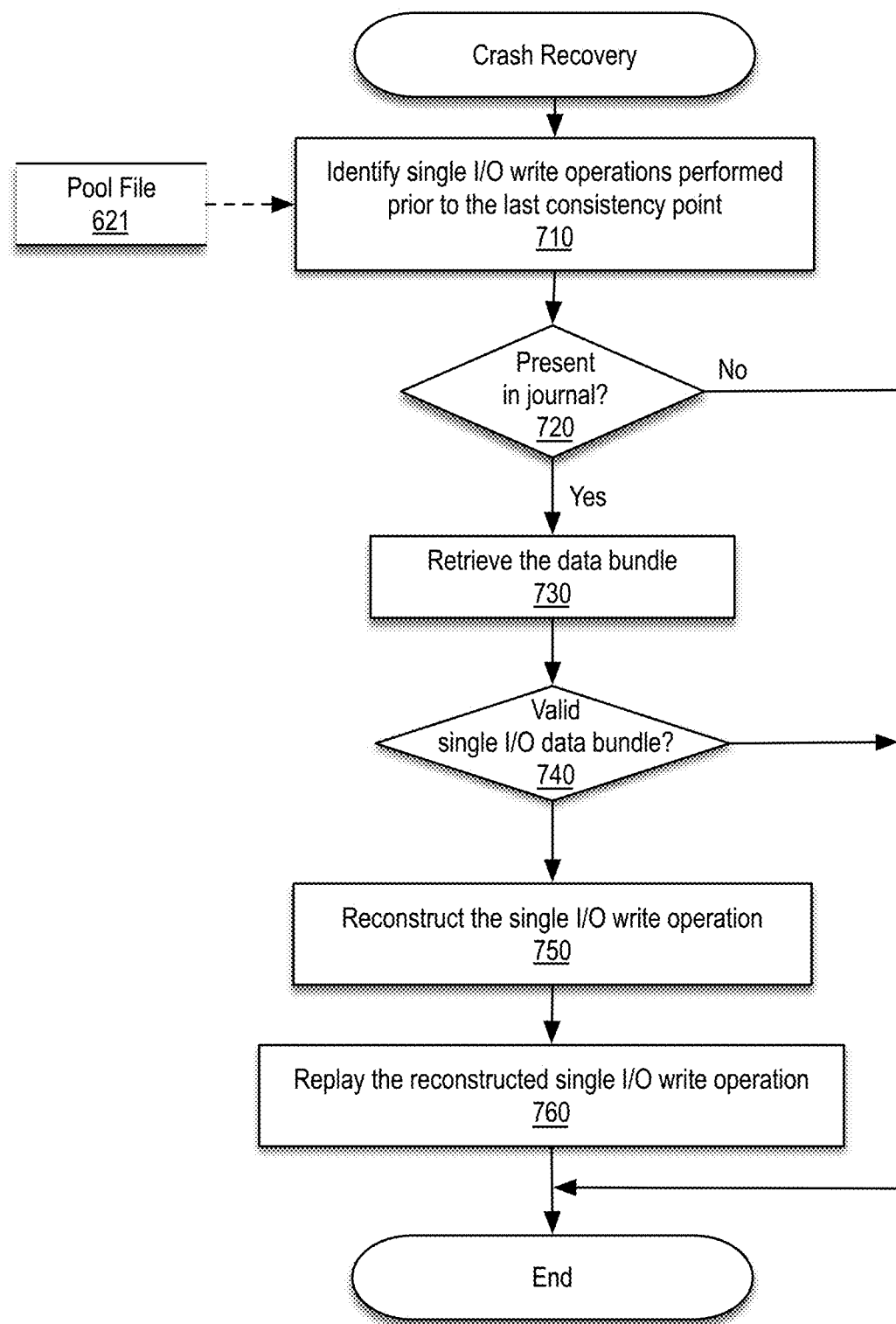
FIG. 7 is a flow diagram illustrating operations for performing crash recovery in accordance with an embodiment of the present disclosure.

FIG. 7 is a flow diagram illustrating operations for performing crash recovery in accordance with an embodiment of the present disclosure. In the context of the present example, it is assumed a storage node (e.g., one of storage nodes 436a-n or one or virtual storage systems 510a-c) of an HA pair has restarted after a system crash.

For cases in which journaling of the operation header (e.g., operation header 312) was completed prior to the system crash, operation is normal and no reconstruction or replay of single I/O writes need be performed. As such, only cases in which the data bundle has been written to disk but the journaling of the operation header was not completed remain In one embodiment, these cases are addressed using a data pool arrangement in which a pool of blocks available for single I/O write operations is maintained in the form of a persistent (on-disk) pool file (e.g., pool file 621). The list of available blocks in the pool file may be stored for each CP.

According to one embodiment, the storage node first performs a legacy journal replay to recover data blocks either not associated with single I/O write operations or single I/O write operations for which the journaling was committed to disk. After that replay is completed, those data blocks present in the pool file are walked through to determine which single I/O writes are to be reconstructed and replayed starting at block 710.

In the context of the present example, after a crash, a given data block present in the pool file may be classified in one of the following categories:

1. Valid single I/O data block that is present in the journal.
2. Valid single I/O data block that is not present in the journal
3. Invalid operation.
4. Single I/O operation not replied in front-end.

According to one embodiment, the operations described below seek to consider the various scenarios and reconstruct and replay only those single I/O writes in category #2 (above).

At block 710, the file system of the storage node obtains the list of available blocks from the last stored CP.

At decision block 720, this list is compared to blocks that the journal indicates have been used for single I/O write operations by determining whether such blocks are present in the journal. This removes blocks that were recovered using legacy journal replay operations from the list. For those blocks remaining in the list, processing continues with block 730; otherwise, no reconstruction or recovery is performed for the block at issue.

The remaining blocks in the list are then read from disk starting at block 730, looking for any blocks that contain a data bundle packed block header (e.g., pack header 351) that contains one or more operation header entries.

At decision block 740, it is determined if the data block at issue is a valid single I/O data bundle. If so, then processing continues with block 750; otherwise, otherwise, no reconstruction or recovery is performed for the block at issue. If the data block at issue contains an operation header entry, then the data block is considered to be a valid single I/O data bundle as the data block was successfully stored using a single I/O write. The operations associated with valid single I/O data bundles are reconstructed and replayed by continuing with block 750.

At block 750, the single I/O write operation may be reconstructed based on the metadata of the packed block header and the compressed data payload stored within the corresponding data block.

At block 760, the reconstructed single I/O write operation is replayed by the file system of the storage node.

While not described above in the context of FIG. 6, in on embodiment, a cap may be imposed on the number of data blocks to be scanned from the pool file by limiting the number of single I/O write operations that can be outstanding at any given time. In this manner, only that smaller number of blocks representing the maximum number of outstanding single I/O write operations can be scanned from the pool file.

While in the context of the present example, a number of enumerated blocks are included, it is to be understood that examples may include additional blocks before, after, and/or in between the enumerated blocks. Similarly, in some examples, one or more of the enumerated blocks may be omitted and/or performed in a different order.

Example Computer System

Embodiments of the present disclosure include various steps, which have been described above. The steps may be performed by hardware components or may be embodied in machine-executable instructions, which may be used to cause a processing resource (e.g., a general-purpose or special-purpose processor) programmed with the instructions to perform the steps. Alternatively, depending upon the particular implementation, various steps may be performed by a combination of hardware, software, firmware and/or by human operators.

Embodiments of the present disclosure may be provided as a computer program product, which may include a non-transitory machine-readable storage medium embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware).

Various methods described herein may be practiced by combining one or more non-transitory machine-readable storage media containing the code according to embodiments of the present disclosure with appropriate special purpose or standard computer hardware to execute the code contained therein. An apparatus for practicing various embodiments of the present disclosure may involve one or more computers (e.g., physical and/or virtual servers) (or one or more processors within a single computer) and storage systems containing or having network access to computer program(s) coded in accordance with various methods described herein, and the method steps associated with embodiments of the present disclosure may be accomplished by modules, routines, subroutines, or subparts of a computer program product.

Figure 8:
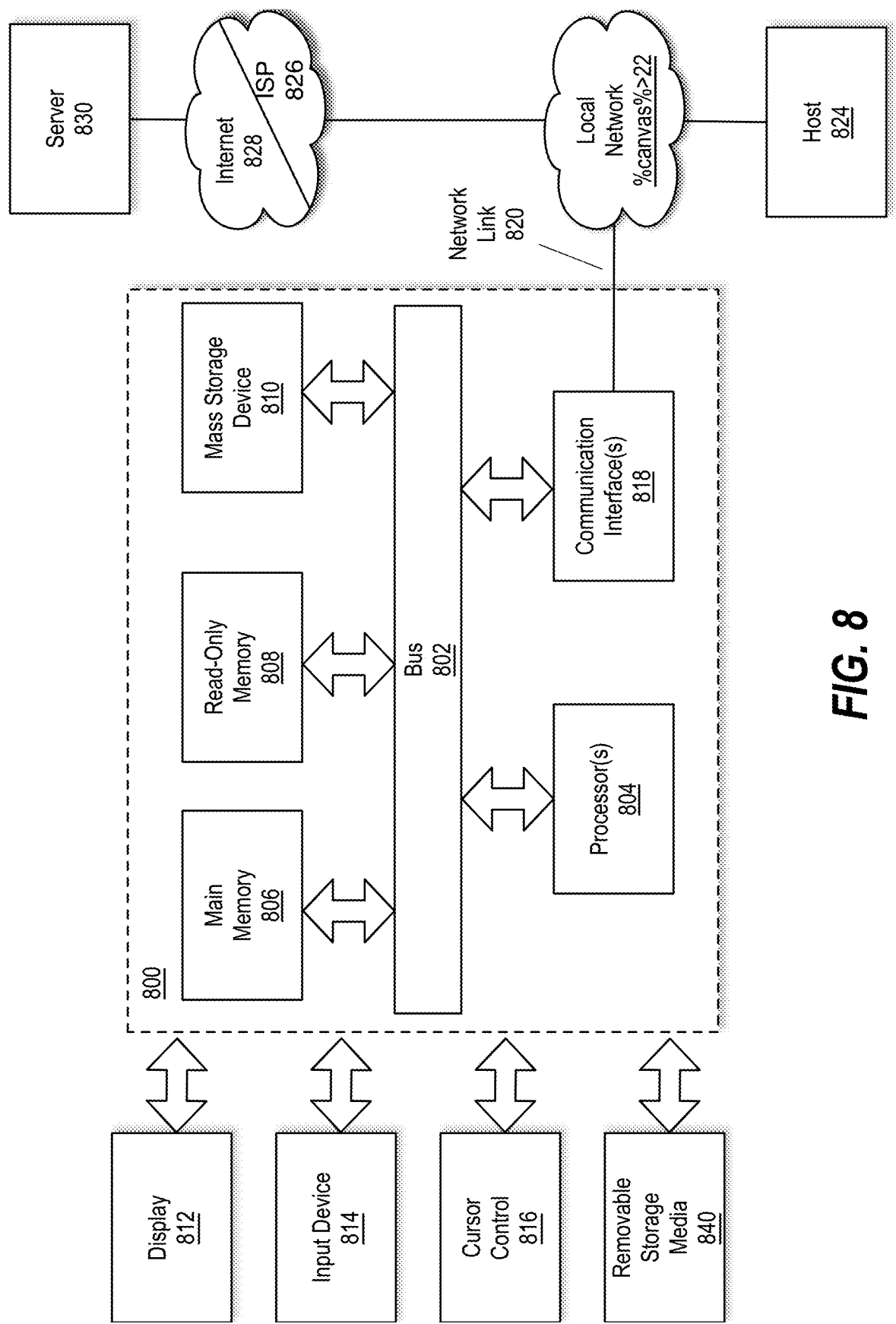
FIG. 8 illustrates an example computer system in which or with which embodiments of the present disclosure may be utilized.

FIG. 8 is a block diagram that illustrates a computer system 800 in which or with which an embodiment of the present disclosure may be implemented. Computer system 800 may be representative of all or a portion of the computing resources associated with a node (e.g., one of storage nodes 436a-n or one or virtual storage systems 510a-c) of a distributed storage system. Notably, components of computer system 800 described herein are meant only to exemplify various possibilities. In no way should example computer system 800 limit the scope of the present disclosure. In the context of the present example, computer system 800 includes a bus 802 or other communication mechanism for communicating information, and a processing resource (e.g., a hardware processor 804) coupled with bus 802 for processing information. Hardware processor 804 may be, for example, a general purpose microprocessor.

Computer system 800 also includes a main memory 806, such as a random access memory (RAM) or other dynamic storage device, coupled to bus 802 for storing information and instructions to be executed by processor 804. Main memory 806 also may be used for storing temporary variables or other intermediate information during execution of instructions to be executed by processor 804. Such instructions, when stored in non-transitory storage media accessible to processor 804, render computer system 800 into a special-purpose machine that is customized to perform the operations specified in the instructions.

Computer system 800 further includes a read only memory (ROM) 808 or other static storage device coupled to bus 802 for storing static information and instructions for processor 804. A storage device 810, e.g., a magnetic disk, optical disk or flash disk (made of flash memory chips), is provided and coupled to bus 802 for storing information and instructions.

Computer system 800 may be coupled via bus 802 to a display 812, e.g., a cathode ray tube (CRT), Liquid Crystal Display (LCD), Organic Light-Emitting Diode Display (OLED), Digital Light Processing Display (DLP) or the like, for displaying information to a computer user. An input device 814, including alphanumeric and other keys, is coupled to bus 802 for communicating information and command selections to processor 804. Another type of user input device is cursor control 816, such as a mouse, a trackball, a trackpad, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane.

Removable storage media 840 can be any kind of external storage media, including, but not limited to, hard-drives, floppy drives, IOMEGA® Zip Drives, Compact Disc-Read Only Memory (CD-ROM), Compact Disc-Re-Writable (CD-RW), Digital Video Disk-Read Only Memory (DVD-ROM), USB flash drives and the like.

Computer system 800 may implement the techniques described herein using customized hard-wired logic, one or more ASICs or FPGAs, firmware or program logic which in combination with the computer system causes or programs computer system 800 to be a special-purpose machine. According to one embodiment, the techniques herein are performed by computer system 800 in response to processor 804 executing one or more sequences of one or more instructions contained in main memory 806. Such instructions may be read into main memory 806 from another storage medium, such as storage device 810. Execution of the sequences of instructions contained in main memory 806 causes processor 804 to perform the process steps described herein. In alternative embodiments, hard-wired circuitry may be used in place of or in combination with software instructions.

The term "storage media" as used herein refers to any non-transitory media that store data or instructions that cause a machine to operation in a specific fashion. Such storage media may comprise non-volatile media or volatile media. Non-volatile media includes, for example, optical, magnetic or flash disks, such as storage device 810. Volatile media includes dynamic memory, such as main memory 806. Common forms of storage media include, for example, a flexible disk, a hard disk, a solid state drive, a magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media.

For example, transmission media includes coaxial cables, copper wire and fiber optics, including the wires that comprise bus 802. Transmission media can also take the form of acoustic or light waves, such as those generated during radio-wave and infra-red data communications.

Various forms of media may be involved in carrying one or more sequences of one or more instructions to processor 804 for execution. For example, the instructions may initially be carried on a magnetic disk or solid state drive of a remote computer. The remote computer can load the instructions into its dynamic memory and send the instructions over a telephone line using a modem. A modem local to computer system 800 can receive the data on the telephone line and use an infra-red transmitter to convert the data to an infra-red signal. An infra-red detector can receive the data carried in the infra-red signal and appropriate circuitry can place the data on bus 802. Bus 802 carries the data to main memory 806, from which processor 804 retrieves and executes the instructions. The instructions received by main memory 806 may optionally be stored on storage device 810 either before or after execution by processor 804.

Computer system 800 also includes a communication interface 818 coupled to bus 802. Communication interface 818 provides a two-way data communication coupling to a network link 820 that is connected to a local network 822. For example, communication interface 818 may be an integrated services digital network (ISDN) card, cable modem, satellite modem, or a modem to provide a data communication connection to a corresponding type of telephone line. As another example, communication interface 818 may be a local area network (LAN) card to provide a data communication connection to a compatible LAN. Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the worldwide packet data communication network now commonly referred to as the "Internet" 828. Local network 822 and Internet 828 both use electrical, electromagnetic or optical signals that carry digital data streams. The signals through the various networks and the signals on network link 820 and through communication interface 818, which carry the digital data to and from computer system 800, are example forms of transmission media.

Computer system 800 can send messages and receive data, including program code, through the network(s), network link 820 and communication interface 818. In the Internet example, a server 830 might transmit a requested code for an application program through Internet 828, ISP 826, local network 822 and communication interface 818. The received code may be executed by processor 804 as it is received, or stored in storage device 810, or other non-volatile storage for later execution.

What is claimed is:

1. A non-transitory machine readable medium storing instructions, which when executed by a processing resource of a node of distributed storage system, cause the node to:
  responsive to receiving a write operation from a client by a file system layer of the node and determining a data payload of the write operation meets a compressibility threshold, cause an intermediate storage layer of the node logically interposed between the file system layer and a block storage media to perform a single input/output (I/O) write operation, wherein the single I/O write operation involves writing a packed block header containing an operation header entry corresponding to the write operation, and the data payload in compressed form to a data block associated with a particular block number within the block storage media; and
  responsive to completion of the single I/O write:
    initiate, by the file system layer, journaling of an operation header containing the particular block number; and
    without waiting for completion of the journaling, acknowledge, by the file system layer, receipt of the write operation to the client.

2. The non-transitory machine readable medium of claim 1, wherein the instructions further cause the node to:
  maintain, by the file system layer, a persistent on-disk data structure containing information regarding a plurality of block numbers that are available for single I/O write operations;
  mark the particular block number within the persistent on-disk data structure as being associated with a particular consistency point (CP) active at a time of the single I/O write operation; and
  prior to performing the single I/O write operation, store information regarding the particular CP within metadata of the packed block header.

3. The non-transitory machine readable medium of claim 2, wherein the journaling includes logging to a journal and mirroring of the journal to a high-availability (HA) partner node of a second distributed storage system and wherein the instructions further cause the node to during recovery from a crash of the node, identify (i) those of a plurality of single I/O write operations performed by the node prior to performance of a last CP by the node that are to be reconstructed and replayed based on the persistent on-disk data structure, (ii) information regarding the last CP, and (iii) operation headers contained in the journal.

4. The non-transitory machine readable medium of claim 3, wherein identification of said those of a plurality of single I/O write operations comprises for any block numbers marked in the persistent on-disk data structure as being associated with the last CP, that are not present in the journal, determining whether a corresponding data block persisted to the collection of disks represents a valid single I/O data block based on existence of a packed block header within the corresponding data block.

5. The non-transitory machine readable medium of claim 4, wherein the instructions further cause the node to for each identified single I/O write operation of the identified plurality of single I/O write operations:
  reconstruct the single I/O write operation based on the metadata of the packed block header and the compressed data payload of the corresponding data block; and
  replay the reconstructed single I/O write operation.

6. The non-transitory machine readable medium of claim 1, wherein the node comprises a virtual storage system or a commodity computer system without battery-backed non-volatile random access memory.

7. A method comprising:
  responsive to receiving a write operation from a client by a file system layer of a node of a distributed storage system and determining a data payload of the write operation meets a compressibility threshold, causing an intermediate storage layer of the node logically interposed between the file system layer and a block storage media to perform a single input/output (I/O) write operation, wherein the single I/O write operation involves writing a packed block header containing an operation header entry corresponding to the write operation, and the data payload in compressed form to a data block associated with a particular block number within the block storage media; and responsive to completion of the single I/O write:
initiating, by the file system layer, journaling of an operation header containing the particular block number; and
without waiting for completion of the journaling, acknowledging, by the file system layer, receipt of the write operation to the client.

8. The method of claim 7, further comprising:
maintaining, by the file system layer, a data structure containing information regarding a plurality of block numbers that are available for single I/O write operations;
marking the particular block number within the data structure as being associated with a particular consistency point (CP) active at a time of the single I/O write operation; and
prior to performing the single I/O write operation, storing information regarding the particular CP within metadata of the packed block header.

9. The method of claim 8, wherein the journaling includes logging to a journal and mirroring of the journal to a high-availability (HA) partner node of a second distributed storage system and wherein the method further comprises during recovery from a crash of the node identifying those of a plurality of single I/O write operations performed by the node prior to performance of a last CP by the node that are to be reconstructed and replayed based on the data structure, information regarding the last CP, and operation headers contained in the journal.

10. The method of claim 9, wherein said identifying comprises for any block numbers marked in the data structure as being associated with the last CP, that are not present in the journal, determining whether a corresponding data block persisted to the collection of disks represents a valid single I/O data block based on existence of a packed block header within the corresponding data block.

11. The method of claim 10, further comprising for each identified single I/O write operation of the identified plurality of single I/O write operations:
reconstructing the single I/O write operation based on the metadata of the packed block header and the compressed data payload of the corresponding data block; and
replaying the reconstructed single I/O write operation.

12. A distributed storage system comprising:
a processing resource; and
a non-transitory computer-readable medium, coupled to the processing resource, having stored therein instructions that when executed by the processing resource cause a node of the distributed storage system to:
responsive to receiving a write operation from a client by a file system layer of the node and determining a data payload of the write operation meets a compressibility threshold, cause an intermediate storage layer of the node logically interposed between the file system layer and a block storage media to perform a single input/output (I/O) write operation, wherein the single I/O write operation involves writing a packed block header containing an operation header entry corresponding to the write operation, and the data payload in compressed form to a data block associated with a particular block number within the block storage media; and responsive to completion of the single I/O write:
initiate, by the file system layer, journaling of an operation header containing the particular block number; and
without waiting for completion of the journaling, acknowledge, by the file system layer, receipt of the write operation to the client.

13. The distributed storage system of claim 12, wherein the instructions further cause the node to:
maintain, by the file system layer, a persistent on-disk data structure containing information regarding a plurality of block numbers that are available for single I/O write operations;
mark the particular block number within the persistent on-disk data structure as being associated with a particular consistency point (CP) active at a time of the single I/O write operation; and
prior to performing the single I/O write operation, store information regarding the particular CP within metadata of the packed block header.

14. The distributed storage system of claim 13, wherein the journaling includes logging to a journal and mirroring of the journal to a high-availability (HA) partner node of a second distributed storage system and wherein the instructions further cause the node to during recovery from a crash of the node, identify (i) those of a plurality of single I/O write operations performed by the node prior to performance of a last CP by the node that are to be reconstructed and replayed based on the persistent on-disk data structure, (ii) information regarding the last CP, and (iii) operation headers contained in the journal.

15. The distributed storage system of claim 14, wherein identification of said those of a plurality of single I/O write operations comprises for any block numbers marked in the persistent on-disk data structure as being associated with the last CP, that are not present in the journal, determining whether a corresponding data block persisted to the collection of disks represents a valid single I/O data block based on existence of a packed block header within the corresponding data block.

16. The distributed storage system of claim 15, wherein the instructions further cause the node to for each identified single I/O write operation of the identified plurality of single I/O write operations:
reconstruct the single I/O write operation based on the metadata of the packed block header and the compressed data payload of the corresponding data block; and
replay the reconstructed single I/O write operation.

17. The distributed storage system of claim 13, wherein the node comprises a virtual storage system.

18. The distributed storage system of claim 13, wherein the node comprises a commodity computer system without battery-backed non-volatile random access memory.

19. The distributed storage system of claim 12, wherein the intermediate storage layer comprises a redundant array of independent disks (RAID) layer.

20. The distributed storage system of claim 19, wherein the block storage media comprises a collection of disks managed by the RAID layer.

* * * * *